United States Patent
McEneany (12) 
(10) Patent No.: US 7,133,065 B2
(45) Date of Patent: Nov. 7, 2006

(54) SYSTEM AND METHOD FOR SELECTIVELY PROVIDING VIDEO OF TRAVEL DESTINATIONS

(76) Inventor: Ian P McEneany, 11750 Magnolia Falls Dr., Jacksonville, FL (US) 32258

( * ) Notice: Subject to any disclaimer, the term of this patent is extended or adjusted under 35 U.S.C. 154(b) by 291 days.

(21) Appl. No.: 10/897,779

(22) Filed: Jul. 22, 2004

(65) Prior Publication Data

US 2006/0020990 A1    Jan. 26, 2006

(51) Int. Cl.
*H04N 7/18* (2006.01)
(52) U.S. Cl. ...................................... 348/143; 348/150
(58) Field of Classification Search ........ 348/142–180; 725/100–110
See application file for complete search history.

(56) References Cited

U.S. PATENT DOCUMENTS

| | | | | |
|---|---|---|---|---|
| 4,863,384 A | * | 9/1989 | Slade | 434/107 |
| 5,587,740 A | * | 12/1996 | Brennan | 348/373 |
| 6,428,449 B1 | * | 8/2002 | Apseloff | 482/3 |
| 6,662,195 B1 | * | 12/2003 | Langseth et al. | 707/200 |

* cited by examiner

*Primary Examiner*—Andy Rao
(74) *Attorney, Agent, or Firm*—Mark J. Young (57) ABSTRACT

A system enables selection of live, pre-recorded and locally synchronized video of desirable travel destinations worldwide. The system includes a viewer control module and a display monitor such as a television, a plurality of video cameras aimed at scenic sites of interest, a networked computer communicatively coupled to the video cameras and user control module, and a network for selectively communicating video and data between the various components.

16 Claims, 5 Drawing Sheets

The following information is provided for Jacksonville, Duval County, Florida (longitude W81.7, latitude N30.3):

| Thursday | 3 June 2004 | Eastern Daylight Time |
|---|---|---|
| SUN | | |
| | Begin civil twilight | 5:57 a.m. |
| | Sunrise | 6:25 a.m. |
| | Sun transit | 1:25 p.m. |
| | Sunset | 8:25 p.m. |
| | End civil twilight | 8:52 p.m. |
| MOON | | |
| | Moonrise | 8:16 p.m. on preceding day |
| | Moon transit | 1:26 a.m. |
| | Moonset | 6:33 a.m. |
| | Moonrise | 9:30 p.m. |
| | Moonset | 7:34 a.m. on following day |

Full Moon on 3 June 2004 at 12:20 a.m. Eastern Daylight Time.

FIGURE 5

SYSTEM AND METHOD FOR SELECTIVELY PROVIDING VIDEO OF TRAVEL DESTINATIONS

FIELD OF THE INVENTION

This invention generally relates to an interactive television system, and more particularly, to a television system which enables user selection of live, pre-recorded and locally synchronized videos of desirable sights at travel destinations worldwide.

BACKGROUND

People love to travel and sightsee. However, traveling and sightseeing can be costly, time-consuming and physically demanding. Many people are in no condition to travel. Elderly, sickly and handicapped individuals may have limited mobility. Oftentimes, such individuals are forced to stay close to home to for medical reasons. However, even people who enjoy excellent health are not able to travel as often as they would like to due to financial and/or logistical constraints. Such people are thus relegated to enjoying sights of distant places through magazines, an occasional glimpse of background scenery in a television program or movie, or surfing postings on the Internet.

Even while on a trip, travelers may not have the time or resources to see all local scenic sites of interest. Prudence dictates prioritizing the available sights, so that time and resources are properly allocated. However, without a good reference point, it may be impossible to decide the best sights for someone to see. Regrettably, many wonderful sights may be overlooked.

After returning from a trip, people may wish to reminisce by seeing the sights again. However, static images accessible from the Internet, photographs from the trip and other mementos are far cry from a live dynamic view. While amateur video taken on a trip provides a dynamic view, oftentimes the quality leaves much to be desired, scenes of interest are displayed for a fleeting moment and often buried between lengths of less interesting footage.

The invention is directed to overcoming one or more of the problems as set forth above.

SUMMARY OF THE INVENTION

To solve one or more of the problems set forth above, in an exemplary implementation of the invention, a system which enables selection of live, pre-recorded and locally synchronized video of desirable travel destinations worldwide is provided. The exemplary system includes a user control module and display monitor such as a television, a plurality of video cameras aimed at scenic sites of interest, a networked server computer that is communicatively coupled to the user control modules, and a network for communicating video from a camera to a television. The video cameras are configured to produce high quality video of scenic sites of interest worldwide. The user control module is configured to enable a viewer to enter commands, such as selecting a site and/or a mode for viewing. The networked server computer is configured to receive and process user commands and coordinate transmission of a viewer-selected video in a viewer-selected mode. The television network is configured to enable communication of video, commands and data between the video cameras and television.

In operation, a viewer may select a site of interest and a display mode. The display modes may, for example, include a live view (i.e., a view of the selected site at the current time), an autosync view (i.e., a pre-recorded view of the selected site at the viewer's local time), and a dawn/dusk/day/night view (i.e., pre-recorded views at times of interest).

BRIEF DESCRIPTION OF THE DRAWINGS

The foregoing and other objects, aspects and advantages will be better understood from the following detailed description of an embodiment of the invention with reference to the drawings, in which.

DETAILED DESCRIPTION

The present invention is directed to an interactive communication system and in particular, one adapted for use with video-on-demand cable and satellite television communication systems. The system allows viewers to select among available sightseeing videos and control modes of presentation. Available modes of presentation include a live view (i.e., a view of the selected site at the current time), an autosync view (i.e., a pre-recorded view of the selected site at the viewer's local time), and a dawn/dusk/day/night view (i.e., pre-recorded views at times of interest).

Figure 1:
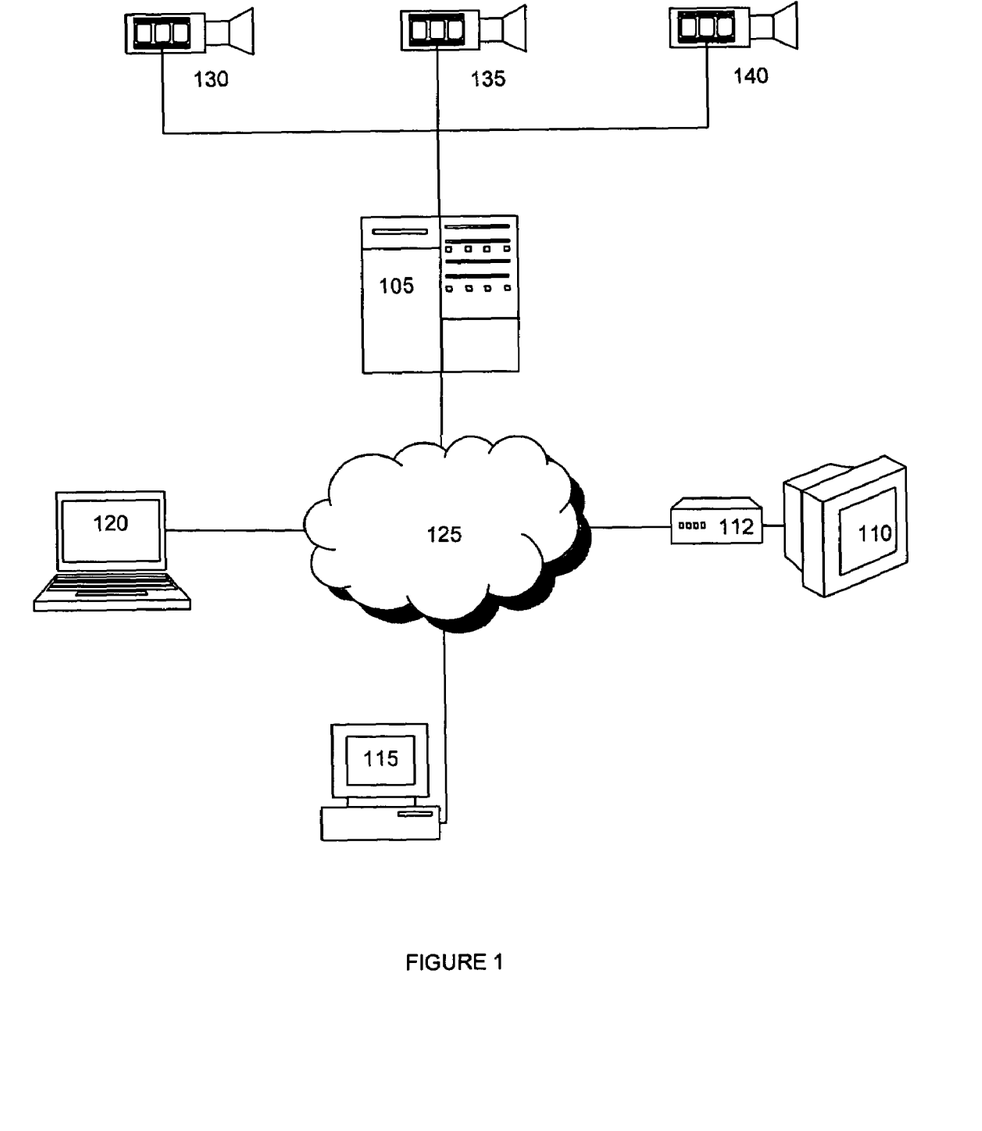
FIG. 1 shows a high-level block diagram of a system upon which an exemplary implementation of the invention may be implemented.

Referring to FIG. 1, a high-level block diagram of an online system in accordance with an exemplary implementation of the invention is shown. A server 105 hosts software for storing and archiving video and performing various functions. Viewers using various control devices 112, 115 and 120 may access request video of certain sites in certain modes of presentation. A plurality of cameras 130–140 produce video which is stored and archived by the server 105. Access between the various components is preferably via data communications networks, which may include the Internet 125, local area networks, wide area networks, wireless networks, wired networks and variations and combinations of any of the foregoing. The particular type of network and protocols employed is not important so long as the networked system enables viewer selection of video of a site and a mode of presentation and server delivery of the selected video in the selected mode of presentation.

An exemplary server 105 is comprised of a computer system, having a bus for communicating information, a central processing unit (CPU), a read only memory (ROM), a random access memory (RAM), a mass storage device, and communications equipment. The storage device may include a hard disk, CD-ROM drive, DVD drive, tape drive, memory (e.g., RAM, ROM, Compact Flash RAM, PCMCIA RAM) and/or other storage equipment. An input device such as a keyboard, touch sensitive screen, a pointing device (e.g., a computer mouse) and the like may also be provided.

Software such as network operating system software is stored on and executable on the server 105.

These elements are typically included in many computer servers. Indeed, the aforementioned server 105 is intended to represent a broad category of computer systems capable of functioning as a video server and hosting application software for processing commands from viewers in accordance with the present invention. Of course, the server 105 may include fewer, different and/or additional elements, provided it is capable of performing the aforementioned functions in accordance with the present invention.

Additionally, the server may either stand alone or operate in a distributed environment. By way of illustration, to achieve a higher transmission capacity and lower long-haul transmission cost, a hierarchical server architecture may be used, in which a plurality of local servers are placed close to viewers and cache video signals dynamically accordingly to local demand. One or more master servers may provide video signals to the local servers as needed.

The server 105 also includes information, documents and software needed to provide functionally and enable performance of methodologies in accordance with an exemplary embodiment of the invention. For example, the server 105 may include web page information and documents (e.g., HTML and XML code), applets and application software, which manage viewer access and use, process transactions and manage databases of video signals.

A plurality of viewers may access the server 105 using compatible controlling devices (i.e., controllers) 112–120 with network connectivity. By way of example, such devices 112–120 may include personal computers, laptop computers, video-on-demand set-top boxes and/or any similarly equipped controlling devices. Each controller 112–120 preferably includes a bus for communicating information, a central processing unit (CPU), a read only memory (ROM), and a random access memory (RAM). Additionally, a mass storage device such as a hard disk, volatile or non-volatile memory and/or other readable and writable storage means, a display device interface and an input device interface are provided. The input device may include a communicatively coupled keyboard, pointing device, joystick, remote control unit and/or other means for inputting data. These elements of the controller 112–120 are typically included in most computer systems and video-on-demand set-top boxes and the aforementioned controller 112–120 is intended to represent a broad category of systems supporting transmission, receipt, storage and processing of video signals in accordance with the present invention.

Of course, the controller 112–120s may include fewer, different and/or additional elements, provided it is capable, when programmed, of performing functions in accordance with the invention. For example, it may be comprised of a digital signal processor (DSP), an application-specific integrated circuit (ASIC), discrete gate logic, or other hardware, firmware, or any conventional programmable software module and a microprocessor in addition to or in lieu of components described above. Controller software modules could reside in ROM and/or RAM memory, flash memory, registers, or any other form of readable storage medium known in the art.

Each controller 112–120 is communicatively connected to a network 110 such as global computer network (e.g., the Internet), a wide area network (WAN), a local are network (LAN), another network configuration that facilitates communications between the controller 112–120 and a server 160, or some combination of the foregoing. By way of example, a network interface implemented on the controller 112–120 provides access to a network and may be any of a wide variety of various wired or wireless interface components including an Ethernet card, a modem, a wireless transceiver (e.g., 802.11) module, a cable or DSL modem, and the like.

Functions of a controller 112–120 preferably include communicating with the server and receiving, storing and processing video signals. To perform these functions, controllers 112–120 preferably include an operating system and application software, i.e., one or more controller programs, that enable users to select video and a mode of presentation and play the video. The controller programs are preferably adapted to perform controller functions and processes as described herein. Among other things, the controller programs preferably enable communication with a server 105 using a determined protocol to receive video signals. The controller programs may also manage the receipt, storage and playing of received video signals. Furthermore, the controller programs may enable interactive functions.

In an exemplary embodiment as depicted in FIG. 1, a plurality of video cameras 130–140 are used to produce video representative of a site. While three cameras are shown for illustrative purposes, it is understood that any number of cameras may be employed without departing from the scope of the invention. In a preferred implementation, high-resolution weatherproof cameras are used. By way of example and not limitation, a high definition camera equipped with a 2 million (or greater) square pixel charged couple device (CCD). The cameras may produce digital video signals or analog-composite signals such as standard NTSC or PAL video, or any other type of signal that can be processed and transmitted through a video delivery system such as a cable or satellite television broadcast system to a plurality of remote locations, for example, homes. The camera output may be converted (e.g., encoded, decoded and transcoded) to any of various analog and digital formats in transit to the controllers 112–120. The video signals communicated to the controllers 112–120 should be in a format that the controllers are adapted for processing. For example, the controllers 112–120 may be configured to receive and play MPEG-4 video data, NTSC signals, or any other standard analog or digital video signals.

The cameras may be configured with lenses adapted to provide any of various fields of view, including narrow, normal, wide angle and panoramic fields of view. In the case of wide angle and panoramic fields of view, hardware and/or software may be included in the system to produce perspective corrected video from the video generated by the camera, thus reducing or eliminating wide-angle and panoramic distortions. Such hardware and/or software for producing perspective corrected views is known in the art.

The cameras are located at various sites and aimed at scenes (i.e., sights) of interest. Preferably, the scenes include popular and exotic sights. If the sites are remote and not served by wired networks, various satellite and/or other wireless communication systems may be utilized to communicate the video signals to the server 105.

Data may be transmitted along with video signals over a broadcast channel. The data enables user interaction. Any conventional data format is acceptable with the understanding that the data may be inserted as a header, a separate packet, as blank lines within vertical blanking intervals, or in other formats suitable for transmission to a controller 112–120. By way of example and not limitation, NTSC video output signal may be supplied to a standard data bridge luminance inserter configured to insert luminance modulated data on horizontal blanking interval lines within a vertical blanking interval. The video signals and data are transmitted over any conventional television distribution system including a broadcast, satellite or cable delivery system. The individual television channel carrying the program may be selected using a conventional TV tuner as found in a television.

An exemplary format for the transmitted data is closed captioning information format. In general, this format transmits a stream of data preceded by a start bit, driving one line of a vertical blanking interval and located between synchronization pulses. However, those skilled in the art will appreciate that the invention is not dependent upon a specific method of transmitting data. Other methods of communicating data along with video signals or apart from video signals for enabling user control may be used without departing from the invention.

In another exemplary implementation, a controller may maintain two distinct data channels (i.e., separate logical and/or physical communication paths) with the server, such as (1) a COM channel for communicating requests and responses between the server and controller and (2) a media channel for receiving video from the server. Each channel may maintain a Transmission Control Protocol/Internet Protocol (TCP/IP) connection with the server. The TCP layer manages the disassembling of a data unit (e.g., a message, video data) into smaller packets (or datagrams) that are efficiently transmitted and routed over the network and the reassembling of received packets into the original data unit. The IP layer handles the address part of each packet so that it reaches the intended destination. Use of the TCP/IP protocol helps to ensure that every packet sent by the server is received by the controller. The controller may also use another protocol to interface with a network access provider as an intermediary. For example, the controller may use a Serial Line Internet Protocol (SLIP) or Point-to-Point Protocol (PPP) to encapsulate IP packets so that they can be sent over a transmission medium to a network access provider's system without departing from the scope of the present invention.

Figure 2:
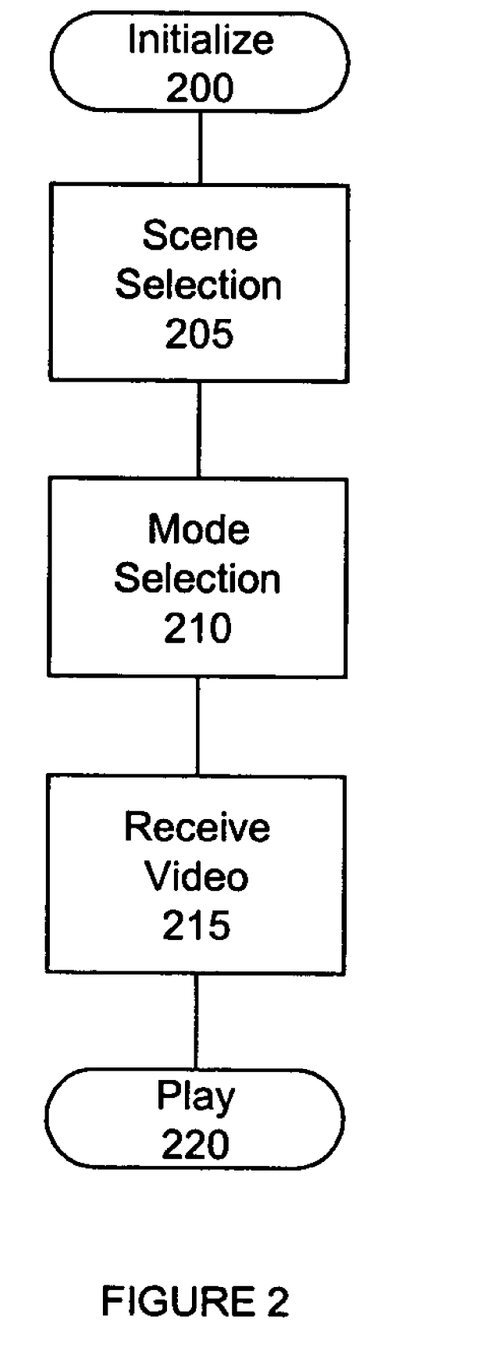
FIG. 2 is a flow diagram illustrating steps of a user interface methodology in accordance with an exemplary implementation of the invention.

Referring now to FIG. 2, a flowchart of a viewer selection process from the controller perspective is provided. Initialization involves establishing a session between the controller 112–120 and a server 105, which may entail controller authentication and initial requests, as in step 200. For example, as part of the initialization step 200, an authenticated controller 112–120 may send a request for a master list to a server 105. The master list is any compilation of data that identifies the available camera sites and modes of presentation. In response to the request, the server may send the list to the controller 112–120. Upon receiving the master list, the controller may present available choices to a viewer for scene (i.e., camera site) selection 205 and mode selection 210. Using a controller 112–120 a viewer may select an available camera site and mode of presentation, as in step 205. In response to the viewer's selections, the controller 112–120 may send a corresponding request to the server 105. The server 105 will respond by sending the requested video to the controller 112–120. As the video is received by the controller 112–120 as in step 215, the controller 112–120 causes the video to be played on the corresponding display device 110, 115–120 in a conventional manner.

Figure 3:
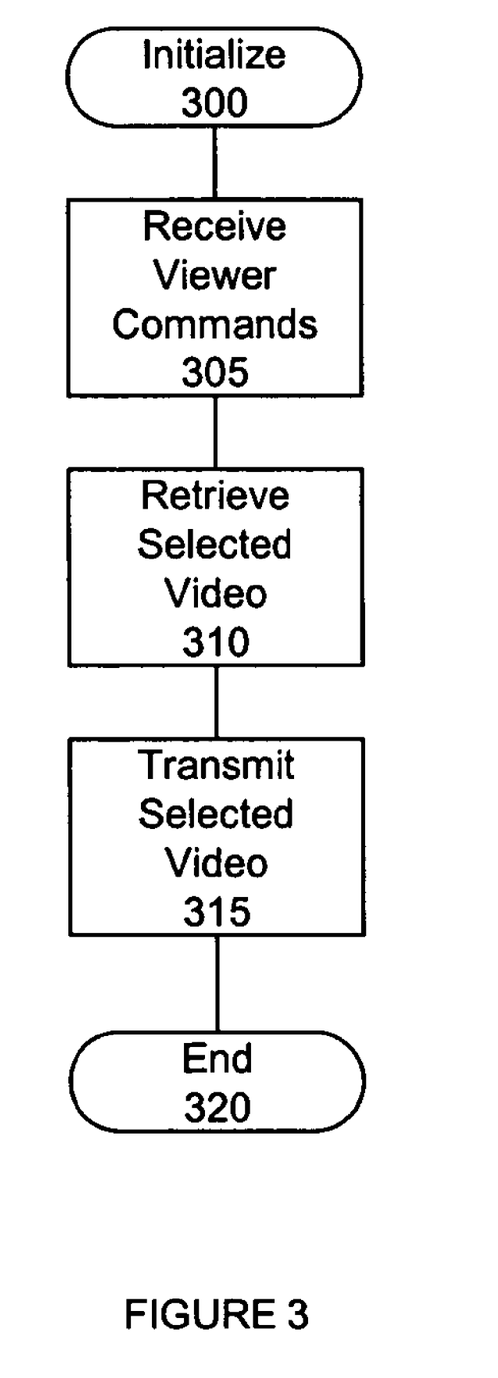
FIG. 3 is a flow diagram illustrating steps of a video selection and delivery methodology in accordance with an exemplary implementation of the invention.

Referring now to FIG. 3, a flowchart of a server process from the server perspective is provided. Initialization involves establishing a session between a controller 112–120 and the server 105, which may entail controller authentication and initial requests, as in step 300. For example, as part of the initialization step 300, the server may send a master list in response to a request from an authenticated controller 112–120. Upon receiving the master list, the controller may present available choices to a viewer for scene (i.e., camera site) selection 205 and mode selection 210. Using a controller 112–120, a viewer may select an available camera site and mode of presentation, consequently communicating viewer commands to the server 105. In response, the server 105 will retrieve the selected video, as in step 310, and send the requested video to the controller 112–120, as in step 315.

Figure 4:
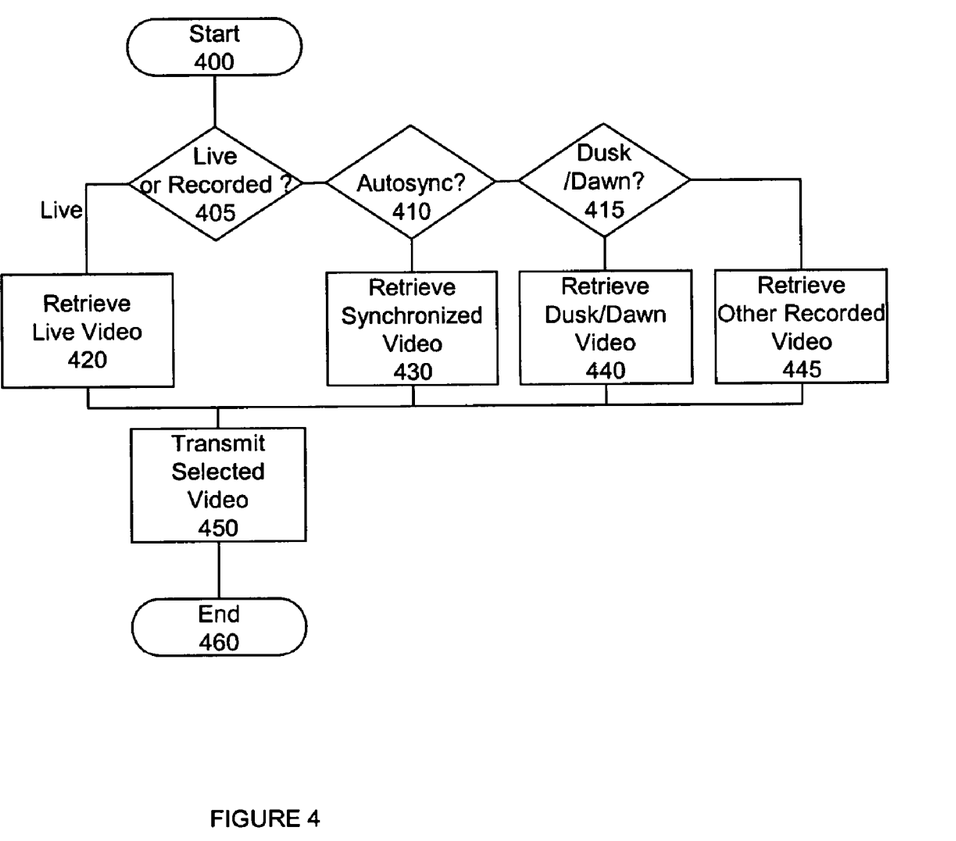
FIG. 4 is another flow diagram illustrating steps of a video selection and delivery methodology in accordance with an exemplary implementation of the invention.

In an exemplary implementation, the system is configured to offer a viewer several modes of presentation. Referring now to FIG. 4, a high level flowchart of a mode selection methodology is sown. A live (i.e., real time) view mode of presentation, as in step 420, provides video streamed from a selected camera site at or about the current time, save delays for processing, latency and network congestion. Other modes may utilize pre-recorded video, as in steps 410, 430 and 440.

An autosync mode, as in step 410, provides a pre-recorded view of a selected site at the viewer's local time (i.e., viewer time). By way of illustration, at 7:00 am (a viewer's local time) a viewer in Florida may request autosync video of the Eiffel Tower. The system will play pre-recorded video of the Eiffel Tower at or about 7:00 am France time. Viewer time may be determined from a conventional clock circuit within the controller.

To enable an autosync mode, the server 105 receives, time stamps and stores video segments from video generated by the cameras 130–140. The reception, time stamping and storing may occur on a substantially continuous basis. Time stamping entails associating an actual or approximate time of video creation (i.e., video time) with each segment of video stored by the server 105. The video time may be provided by the camera or may correspond to a time the video is first received by the server.

Upon viewer selection of a camera site 130–140 and the autosync mode of presentation, the controller 112–120 communicates the site information, autosync command and viewer time to the server 105. In response, the server 105 retrieves the stored time-stamped video segment that is closest in time to the viewer time, or a segment that has some other determined temporal proximity relationship with the viewer time. The server 105 then delivers that retrieved segment (i.e., the initial autosync segment) to the controller 112–120, as in step 450. The transmission step further entails having the server 105 continue to send to the controller 112–120 segments that are temporally successive to the initial autosync segment throughout the remainder of the autosync viewing session. The initial autosync segment and the temporally successive segments are considered to be synchronized.

In an exemplary implementation, the system is also configured to offer a dawn/dusk/day/night view (i.e., a solar mode of presentation) as in step 415, which provides pre-recorded views at parts of a default or selected day. The default day may be a particularly clear day. This mode of operation may cycle through video segments of one or more of the various parts of day to be displayed. Thus for example, a viewer may select a night view of the Manhattan skyline; dawn, dusk, day and night views of the skyline; or some combination of various available parts of a day.

Upon viewer selection of a camera site 130–140 and the dusk/dawn mode of presentation 415, the controller 112–120 communicates the site information and dawn/dusk commands to the server 105. In response, the server 105 retrieves the stored time-stamped video segment that corresponds to a user-selected dawn/dusk/day/night view, or combination of such views, as in step 440. The server 105 then delivers that retrieved segment (i.e., the initial dawn/dusk/day/night segment) to the controller 112–120, as in step 450. Optionally, the transmission step may further entail having the server 105 continue to send to the controller 112–120 dawn/dusk/day/night view segments that are temporally successive to the initial dawn/dusk/day/night view segment throughout the remainder of the viewing session.

The system may also be configured to provide other recorded views 445, in lieu of or in addition to autosync and dawn/dusk/day/night views. Such other recorded views may include views on a particular date and time, or views during a particular event (e.g., a meteorological event or lunar event).

More specifically, by way of illustration, the system may be configured to provide lunar views. This mode of view provides pre-recorded nighttime views at selected stages of the lunar cycle. Thus, for example, a viewer may select a nighttime view of a site during a full moon.

Figure 5:
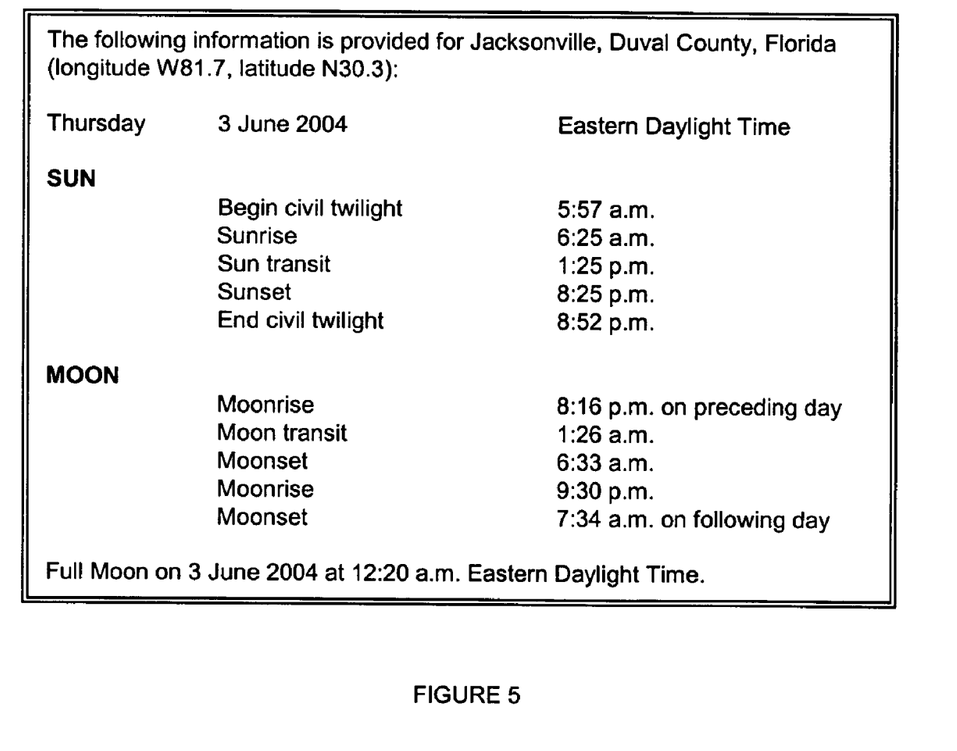
FIG. 5 shows exemplary solar and lunar data for a particular location and a particular day.

To enable solar and lunar modes, the server 105 may maintain a list of solar and lunar data for each camera site. Such data is compiled and readily available from various government, quasi-governmental and private entities. By way of example, and not limitation, the U.S. Naval Observatory—Astronomical Applications Department maintains such data <http://aa.usno.navy.mil/>. An example of such data is provided for Jacksonville, Fla. on Jun. 3, 2004 in FIG. 5. By maintaining a list that associates parts of day and night with times of day for each site and for each date of stored video, the system readily enables retrieval of time-stamped segments, as described above, for a given part of a day or night or a stage of the lunar cycle.

The system may further be configured to provide meteorological views corresponding to certain whether conditions. Meteorological data is compiled and readily available from various government, quasi-governmental and private entities. By way of example, and not limitation, the National Climate Data Center of the National Oceanic and Atmospheric Administration, an agency of the U.S. Department of Commerce maintains extensive archives of meteorological data, including hourly data on weather conditions such as clear, snow, rain and wind that would be visible in video for over 12,000 global sites. Much like the solar and lunar data described above, meteorological data of interest may be associated with stored video segments. Thus, the system readily enables retrieval of time-stamped segments of stored video data corresponding to certain weather conditions.

Those skilled in the art will appreciate that other modes of presentation, such as, for example, random modes, may be utilized and come within the scope of the invention. Thus, a user may delegate the selection of video to the server 105 or controller 112–120, which may be equipped with a random video selection software module, using various random selection routines known in the art.

Optionally, the video may include a soundtrack. The soundtrack may contain music, narration, recorded sounds from the camera site, or combinations of any of the foregoing.

Graphical and/or textual information may also be provided for display with the video. Thus, for example, continuously or periodically during a displayed video, a caption may identify the corresponding camera site, time, date, weather conditions, lunar stage, and/or other pertinent information.

Advantageously, an exemplary system and methodology according to the invention enables viewers to enjoy beautiful scenery from the convenience of their own home. The system also enables a user to select synchronized video and video corresponding to a time of particular interest, a stage of the lunar cycle or certain weather conditions, at any of a plurality of camera sites. The video may be displayed for ornamental, educational and entertainment purposes. Viewers may try to guess the location being displayed.

While the invention has been described in terms of various embodiments and implementations, those skilled in the art will recognize that the invention can be practiced with modification within the spirit and scope of the appended claims.

I claim:

1. A system for providing video of scenic sites of interest, said system comprising:
   a plurality of cameras adapted to produce video signals corresponding to video of scenic sites of interest,
   a server communicatively coupled to the plurality of cameras and configured to receive, store and transmit video data corresponding to the video signals, time-stamp the received video data, and receive and process control commands,
   a controller communicatively coupled to the server and configured to receive video data from the server and produce video output signals,
   said controller including a display device configured to display video corresponding to the video output signals,
   said controller further including a viewer input device configured to produce control commands,
   said control commands including a command to select a site of interest and a command from the group consisting of
   a command to synchronize video from the selected site of interest,
   a command to provide a dawn, dusk, day or night view of the site of interest,
   a command to cycle through at least two of dawn, dusk, day and night views of the site of interest,
   a command to provide a view of the site of interest at determined stage of the lunar cycle,
   a command to provide a view of the site of interest during a determined meteorological event, and
   a command to provide random views of the site of interest, said random views including one or more views from the group consisting of
   a synchronized view,
   a dawn, dusk, day or night view,
   a view of the site of interest at determined stage of the lunar cycle, and
   a view of the site of interest during a determined meteorological event.

2. The system of claim 1, wherein the control commands further include a command to provide a real time stream of video data.

3. The system of claim 1, wherein the control commands further include a command to provide a stored video stream.

4. The system of claim 1, wherein the controller is a device from the group consisting of a personal computer, a laptop computer, and a television operably coupled to a set-top box.

5. The system of claim 1, wherein the plurality of cameras are high definition weatherproof video cameras.

6. The system of claim 1, wherein the control commands further include a command to provide a real time stream of video data, and
   the control commands further include a command to provide a stored video stream.

7. The system of claim 6, wherein the controller is a device from the group consisting of a personal computer, a laptop computer, and a television operably coupled to a set-top box.

8. The system of claim 7, wherein the plurality of cameras are high definition weatherproof video cameras.

9. A method for providing video of scenic sites of interest, said method comprising steps of:

producing video signals corresponding to video of scenic sites of interest using a plurality of cameras, receiving the video signals on a server, storing video data corresponding to the video signals on the server, time-stamping the video data, producing control commands using the controller and communicating the control commands to the server, said control commands including a command to select a site of interest and a command from the group consisting of:

a command to synchronize video from the selected site of interest, a command to provide a dawn, dusk, day or night view of the site of interest, a command to cycle through at least two of dawn, dusk, day and night views of the site of interest, a command to provide a view of the site of interest at determined stage of the lunar cycle, a command to provide a view of the site of interest during a determined meteorological event, and a command to provide random views of the site of interest, said random views including one or more views from the group consisting of a synchronized view, a dawn, dusk, day or night view, a view of the site of interest at determined stage of the lunar cycle, and a view of the site of interest during a determined meteorological event, transmitting the time-stamped video data in response to the control commands, receiving video data from the server using the controller and producing video output signals using the controller, and communicating the video output signals to a display device configured to display video corresponding to the video output signals.

10. The method of claim 9, wherein the control commands further include a command to provide a real time stream of video data.

11. The method of claim 9, wherein the control commands further include a command to provide a stored video stream.

12. The method of claim 9, wherein the controller is a device from the group consisting of a personal computer, a laptop computer, and a television operably coupled to a set-top box.

13. The method of claim 9, wherein the plurality of cameras are high definition weatherproof video cameras.

14. The method of claim 9, wherein the control commands further include a command to provide a real time stream of video data, and the control commands further include a command to provide a stored video stream.

15. The method of claim 14, wherein the controller is a device from the group consisting of a personal computer, a laptop computer, and a television operably coupled to a set-top box.

16. The method of claim 15, wherein the plurality of cameras are high definition weatherproof video cameras.

* * * * *